United States Patent
Culbertson

[11] 3,791,501
[45] Feb. 12, 1974

[54] CAM OPERATED CLUTCH

[75] Inventor: George W. Culbertson, Oconomowoc, Wis.

[73] Assignee: FMC Corporation, San Jose, Calif.

[22] Filed: Mar. 14, 1972

[21] Appl. No.: 234,558

[52] U.S. Cl. .............................. 192/93 A, 74/567
[51] Int. Cl. ............................................ F16d 23/12
[58] Field of Search ...................... 112/93 A, 70.23

[56] References Cited
UNITED STATES PATENTS

| | | | |
|---|---|---|---|
| 2,848,086 | 8/1958 | Warsaw | 192/93 A |
| 2,091,270 | 8/1937 | Colman | 192/93 X |
| 2,574,204 | 11/1951 | Woody et al. | 192/93 |
| 2,661,826 | 12/1953 | Hendrickson et al. | 192/93 |
| 2,700,444 | 1/1955 | Ahlen | 192/93 |
| 3,386,547 | 6/1968 | Hansen | 192/93 X |

*Primary Examiner*—Benjamin W. Wyche
*Attorney, Agent, or Firm*—F. W. Anderson; C. E. Tripp

[57] ABSTRACT

The clutch of the present invention is of the type wherein friction rings associated with a drive member are forced into face-to-face engagement with friction-discs splined to a driven member. The engagement of the friction member is effected by a cam and cam follower mechanism.

2 Claims, 5 Drawing Figures

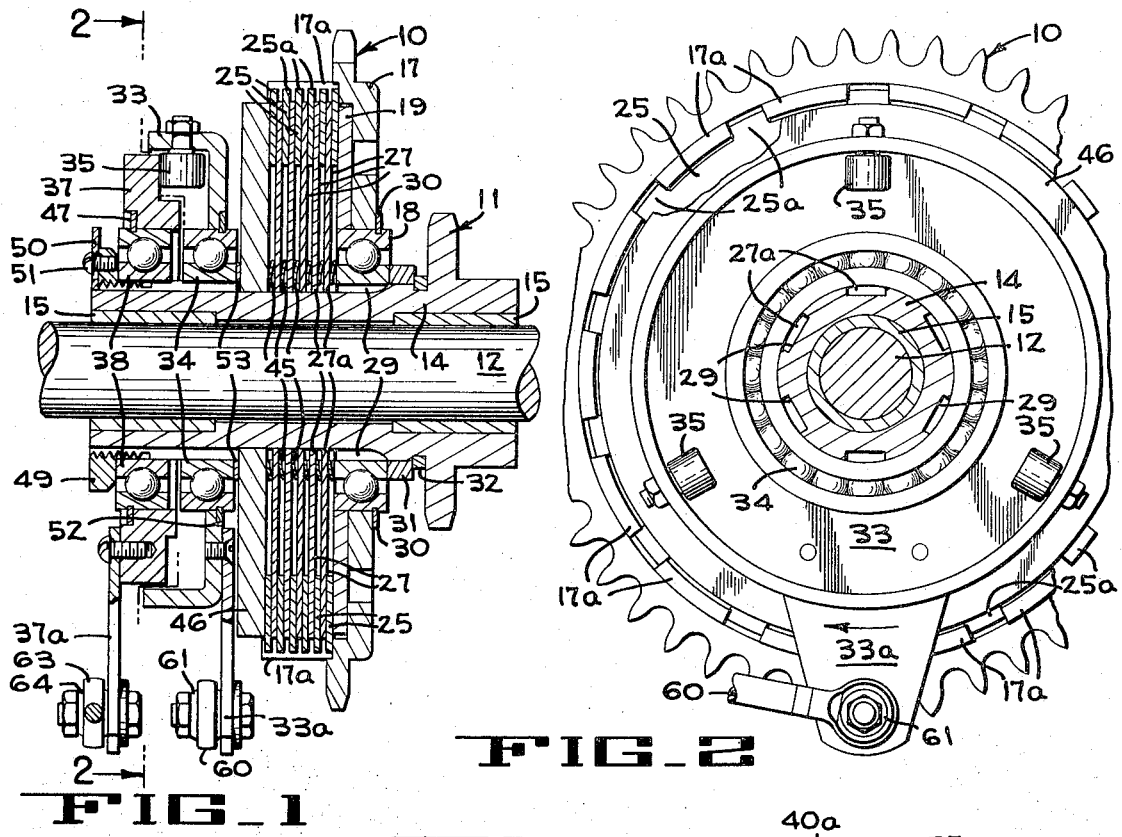
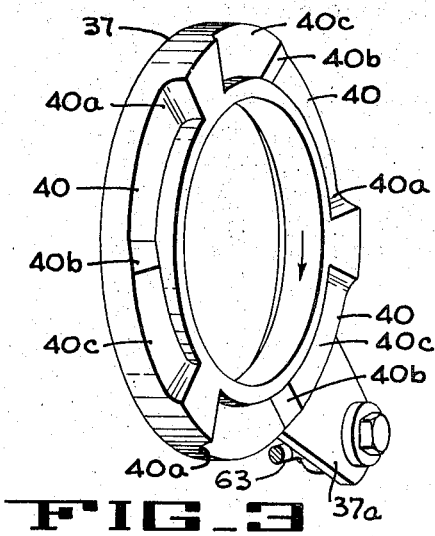
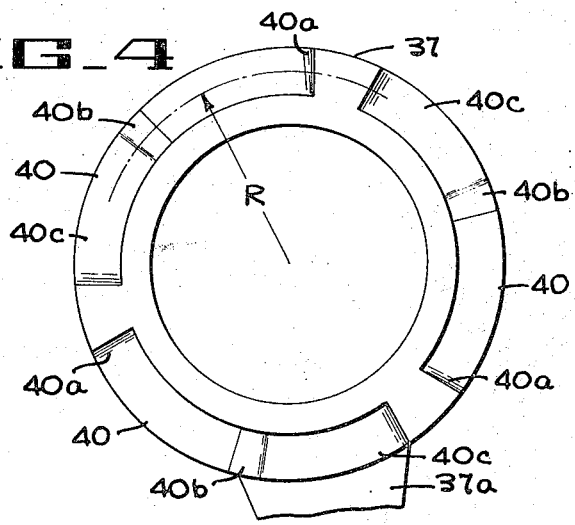
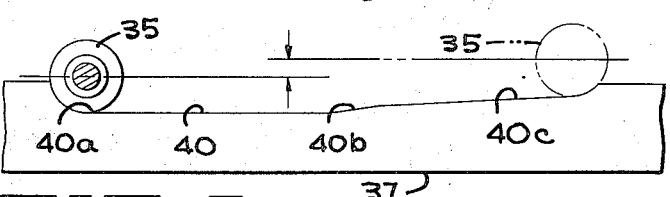
FIG_1  FIG_2  FIG_3  FIG_4  FIG_5

3,791,501

CAM OPERATED CLUTCH

BACKGROUND OF THE INVENTION

Friction clutches of the type with which the present invention is concerned have been used extensively in fairly heavy machinery installations, such as farming machinery, to selectively engage or disengage drive members and driven members. Such clutches are disclosed in U.S. Pat. Nos. 2,661,826, 2,827,994, 3,386,545 and 3,127,969. In such clutches, the friction discs are moved into engagement by a rotary cam mechanism that is actuated by means of one or more pull rods. While previous clutches have enjoyed a degree of success, the clutch of the present invention provides an improved cam roller arrangement for transmitting force between a cam and its follower, and an improved cam contour for effectively applying the transmitted force.

It is therefore an object of the present invention to provide an improved mechanism for engaging and disengaging the friction discs of a friction clutch.

Another object is to provide an improved cam mechanism for a friction clutch.

SUMMARY OF THE INVENTION

The clutch of the present invention comprises a plurality of friction rings splined to a drive sprocket, and a plurality of discs engageable with the friction rings and keyed to a sprocket that is to be driven. A rotary cam follower carrier has rollers in rolling engagement with a rotary cam ring that is provided with a set of unique cam tracks along which the rollers of the rotary cam follower carrier travel. Each cam track features a relatively long idler section during which the friction members are out of engagement, a relatively-short steeply-inclined section for quickly taking up the space between the friction members when they are initially moved toward engagement, and a final section of relatively shallow inclination for smoothly and effectively forcing the friction members into driving engagement.

DESCRIPTION OF THE DRAWING

FIG. 1 is a vertical section taken longitudinally through the clutch of the present invention.

FIG. 2 is a section taken along line 2—2 of FIG. 1.

FIG. 3 is a perspective of the cam ring of the clutch of FIG. 1.

FIG. 4 is an elevation of the cam ring of FIG. 3.

FIG. 5 is a fragmentary schematic view showing a development of a portion of the cam ring of FIG. 3.

The clutch of the present invention is adapted to connect a driving sprocket 10 (FIG. 1) with a driven sprocket 11 that is rotatably mounted on a stationary jackshaft 12.

The driven sprocket 11 is either keyed to or formed integrally with or welded to a sleeve 14 which is rotatably mounted on jackshaft 12 by bushings 15.

The driving sprocket 10 is formed on the periphery of a cup member 17 that is rotatably journaled on the sleeve 14 by means of a bearing unit 18. The cup has a spacer plate 19 welded to its inner face, and has a plurality of drive fingers 17a (FIG. 2) that are arranged in spaced relation around the periphery thereof and project in a direction parallel to jackshaft 12. The drive fingers 17a engage spaced lugs 25a formed on the periphery of the plurality of spaced clutch rings 25 (FIG. 1) that are disposed inside the circle defined by the fingers 17a and have friction material cemented to their side faces. A clutch disc 27 is positioned between each pair of adjacent friction rings 25, and each disc 27 has a plurality of tangs 27a projecting radially inwardly for driving engagement with splines 29 on the sleeve 14. It will be evident that, when the friction rings 25 and the discs 27 are moved toward the right (FIG. 1) and pressed into tight engagement with each other, a drive will be established between the drive sprocket 10 and the driven sprocket 11. During such movement of the rings and the discs, the cup member 17 is prevented from moving to the right by a snap ring 30 on the bearing 18, a spacer ring 31, and a snap ring 32 on sleeve 14.

The rings and discs are moved into engagement with each other by means of a rotary cam roller carrier 33 that is rotatably journaled on the sleeve 14 by a bearing unit 34 which is free to slide axially on sleeve 14. This rotary carrier has three angularly spaced cam followers in the form of rollers 35 (FIG. 2) that ride along the surface of a cam ring 37 which is rotatably supported on a bearing unit 38 that is also free to slide axially on sleeve 14 (FIG. 1). As seen in FIGS. 3–5, the cam ring has three angularly spaced cam tracks 40, and each cam track includes a dwell portion 40a that is in a transverse plane generally normal to the axis of the shaft 12, a relatively steep inclined portion 40b, and a relatively shallow inclined portion 40c. When the cam rollers, which move in a plane transverse to shaft 12, are on the dwell portions 40a, the clutch is disengaged and the friction rings 25 and discs 27 are held out of engagement with each other by Belleville or wave type spring washers 45 (FIG. 1) disposed between the adjacent discs 27 and between an end disc 27 and a pressure plate 46 that is splined on sleeve 14. It will be noted in FIG. 1, that movement of the cam ring 37 in an axial direction toward the left is prevented by a snap ring 47 that is engaged in the outer race of bearing 38. The bearing 38 is, in turn, held against axial movement by a nut 49 that is threaded on the end of sleeve 14. When the nut is screwed onto the sleeve 14 to the position that determines the desired axial position of the cam ring 37, the nut is locked against rotation relative to the sleeve 14 by a key 50 which fits into aligned recesses in the nut and in the sleeve. A screw 51 secures the key to the nut 49.

When the rollers 35 move up the inclined camming surfaces 40b, the rotary cam roller carrier 33 is moved toward the right against a snap ring 52, causing the bearing unit 34 to move to the right and press a spacer washer 53 against the pressure plate 46, urging the plate against the adjacent friction ring 25. Further movement of the rollers along the camming surfaces 40b and along the inclined surface 40c moves the friction rings 25 into driving engagement with the discs 27.

Relative movement between the rotary carrier 33 and the cam ring 37 is accomplished by rotating the carrier 33 clockwise (FIG. 2) while the ring 37 is rotated counterclockwise (FIG. 3). Rotation of carrier 33 is effected by a longitudinal pull on a rod 60 that is connected through a ball joint 61 to an arm 33a formed on or secured to the carrier 33. Similarly, the cam ring 37 is rotated by pulling on a rod 63 (FIG. 3) that is connected through a ball joint 64 (FIG. 1) to an arm 37a rigidly secured to the ring. The rods 60 and 63 may be actuated by means of hydraulic power cylinders (not shown).

At least one of the rods 60 and 63 may include an adjustable section, such as a turn buckle, whereby the angular position of the rollers of the rotary cam 33 can be adjusted relative to the angular position of the annular cam tracks 40 so that, when the rods are in their relaxed or unactuated position, the cam rollers 35 are on the left hand end of the dwell portions 40a of the camming surface, as shown in FIG. 5. Also, it will be evident that the nut 49 determines the position of the pressure plate 46 when the cam rollers 35 are at the outer end of the cam surfaces 40c as illustrated in phantom lines in FIG. 5. Therefore, by rotating the nut 49, the amount of pressure applied against the friction discs 25 and the discs 27 can be adjusted to the desired amount.

A particular feature of the clutch is the configuration of the cam ring 37. For a given pull on the rods 60 and 63, the resulting axial clamping force is determined by the angle of helical inclination of the cam tracks 40c on cam ring 40, i.e., the smaller the slope of the cam track, the greater the wedging action and hence the greater the clamping force.

It is readily observed that for a specific degree of angular rotation of cam ring 40, the resulting axial displacement of the cam roller carrier 33 consists of two parts, first the amount necessary to take up the axial clearances between the friction rings 25 and discs 27, and secondly the amount necessary to apply the required axial pressure after the discs have made a driving engagement or contact.

The first requires little axial force and consequently it can be accomplished by means of a steep sloped cam surface which offers a low mechanical advantage. The second requires a considerable axial force and therefore relies upon a smaller sloped cam surface having a much greater mechanical advantage. The combination of these two slopes can thus produce more axial force for the same angular displacement of the cam ring 40 with the same pull on the rods 60 and 63 than could be provided by a camming surface of uniform slope.

A beneficial side effect of this dual slope cam surface is that it allows a deeper dwell portion 40a to provide more clearance between friction rings 25 and discs 27 thereby reducing "parasitic" drag and allowing a greater volume of cooling media to pass through the disc pack when the clutch is in a disengaged condition.

In one successful arrangement in which the cam track had a mean radius R (FIG. 4) of approximately 2.109 inches, each cam section 40a was in a plane transverse to the jackshaft 12 and had an angular extent of approximately 45°. Each cam section 40b was inclined 10° 7' from the transverse plane and had an angular extent of 8°; and each cam section 40c was inclined 3° from said transverse plane and had an angular extent of 37°.

In the disclosed embodiment, both the roller carrier 33 and the cam ring 40 are rotatable. It is within the scope of the present invention to position either the carrier or the ring in fixed position and move the other member relative to the stationary member through the necessary angular distance. In some arrangements the use of a rod similar to rods 60, 63, which move with a generally straight line movement, may be sufficient; in others an actuator having some angular movement around the axis of jackshaft 12 will be necessary.

It will be understood that modifications and variations may be effected without departing from the scope of the present invention.

What is claimed is:

1. In a clutch of the type wherein first clutch members, which are connected to a driver, are disposed alongside second clutch members that are connected to a driven member, and are normally held out of engagement by a separating means but are arranged for movement into engagement with said second clutch members to establish a connection between said driver and said driven member, the improvement which comprises a cam mechanism operatively connected to said clutch members to move them into engagement comprising a cam ring having a plurality of cam tracks recessed into an axial face thereof, a carrier, followers on said carrier, each follower being associated with one of said cam tracks, means mounting said cam ring and said carrier for relative rotary movement about a fixed axis to move said followers along said cam tracks, each cam track having an elongated idler section in a plane substantially perpendicular to said fixed axis and terminating at one end in a stop portion curved steeply away from said plane, a transition section of abbreviated length inclined to said plane and disposed adjacent the other end of said idler section, an elongated pressure-applying section adjacent said transition section that is of less inclination relative to said plane than is said transition section, said pressure-applying section of each cam track being disposed at an angle of approximately 3° to said plane and terminating in a stop portion curved steeply away from said plane toward said follower, the 3° inclination of the camming surfaces being effective to cause rollers moving up said surfaces to transmit a desired axial force to said clutch members without restricting self-releasing movement of the rollers downward along said surfaces; and means for effecting relative movement between said cam ring and said carrier to move said followers along said tracks.

2. A clutch according to claim 1 wherein the transition section of each cam track is disposed at an angle of approximately 10° 7' to said transverse plane.

* * * * *